United States Patent [19]

Weisburn

[11] Patent Number: 5,584,391
[45] Date of Patent: Dec. 17, 1996

[54] STORAGE CONTAINER FOR RECORDED MEDIA

[75] Inventor: James T. Weisburn, Massillon, Ohio

[73] Assignee: Alpha Enterprises, Inc., North Canton, Ohio

[21] Appl. No.: 499,792

[22] Filed: Jul. 7, 1995

[51] Int. Cl.⁶ .................................................. B65D 85/575
[52] U.S. Cl. ............................ 206/387.15; 206/308.1; 206/564; 211/40; 211/41
[58] Field of Search ............................. 206/0.84, 307.1, 206/308.1, 309, 387.14, 387.15, 561, 564; 211/40, 41

[56] References Cited

U.S. PATENT DOCUMENTS

| D. 255,255 | 6/1980 | Leo | 206/0.8 |
|---|---|---|---|
| 4,203,519 | 5/1980 | Fujitaki | 206/387.15 |
| 4,389,963 | 6/1983 | Pearson | 206/459.5 |
| 4,595,098 | 6/1986 | Kryter | 206/564 |
| 4,819,802 | 4/1989 | Gutierrez | 206/387.15 |
| 4,892,192 | 1/1990 | Johnson | 211/41 |
| 5,289,925 | 3/1994 | Newmark | 211/41 |

*Primary Examiner*—David T. Fidei
*Attorney, Agent, or Firm*—Sand & Sebolt

[57] ABSTRACT

A container for storing and displaying recorded media, such as compact discs, video cassettes, audio cassettes, etc., has a support surface, preferably rotatably mounted. A plurality of spaced ribs are formed on the support surface and extend upwardly therefrom, forming individual storage slots for receiving storage boxes containing the recorded media. A small area of serrated teeth is formed on the support surface adjacent a front end opening of each of the slots. The serrated teeth engage a side of the storage box and retard the outward sliding movement of the box as the container is rotated for review of the various recorded media stored therein.

13 Claims, 3 Drawing Sheets

STORAGE CONTAINER FOR RECORDED MEDIA

BACKGROUND OF THE INVENTION

1. Technical Field

The invention relates to a storage container for recorded media, such as compact discs, video cassettes, audio cassettes, and the like, in which the recorded medium is placed on a supporting surface between a pair of ribs defining a storage slot. More particularly, the invention relates to a retaining device for assisting in maintaining the recorded media in the slots as the storage container is rotated, such as in a carrousel container.

2. Background Information

Various types of recorded media, such as compact discs and video cassettes, have increased considerably in popularity over the years and are purchased in the millions by consumers for home and office use. Various types of storage and display containers and racks have been developed for storing and displaying the recorded medium, which is usually contained in a storage case to protect the compact disc and audio cassette tape. These storage and display racks have various constructions and configurations in order to provide the consumer with a variety of styles and configurations to satisfy the consumer's preference.

One type of storage and display rack is a carrousel wherein the rack is formed with a plurality of spaced ribs which form individual storage slots or compartments for slidably receiving the recorded medium, and, in particular, its storage box, therein. These carrousel-type storage and display racks may consist of a single level or multiple levels in a vertical stacked arrangement. However, one problem that occurs with such rotatable or carrousel type of storage and display racks is that when the unit is rotated, the stored recorded media have a tendency to move outwardly from their stored positions under the influence of centrifugal force.

Various types of retaining mechanisms have been used for other types of storage and display racks, such as shown in U.S. Pat. Nos. 4,741,438 and 4,771,887. However, these types of retaining mechanisms are not readily adaptable for the carrousel-type storage and display racks. Therefore, the need has existed for an improved retaining mechanism or device intended principally for use in a rotatable carrousel-type storage and display rack to assist in retaining the stored media in the rack as it is rotated.

SUMMARY OF THE INVENTION

Objectives of the invention include providing a storage container for storing and displaying recorded media, such as compact discs, video cassettes and the like, which is provided with a relatively simple and inexpensive device to assist in retaining the stored media in their respective slots or compartments, particularly upon rotation of the storage device, such as in a carrousel-type of storage and display rack.

A still further objective of the invention is to provide such a storage container in which the retaining device can be formed inexpensively during the formation of the support platform in a usual molding operation, thereby eliminating the need of any additional parts or components which are subject to breakage and which would require installation and maintenance.

Another objective of the invention is to provide such a storage container in which the retaining device is a series of serrations formed on the support surface between the storage slot-forming ribs, preferably adjacent an open front end thereof, which serrations engage an edge of the stored medium to retard its outward sliding movement.

These objectives and advantages are obtained by the improved storage container of the invention which is used for displaying and storing recorded media, the general nature of which may be stated as including a support surface; a plurality of spaced parallel elongated ribs formed on said surface providing storage slots between adjacent pairs of the ribs for receiving storage boxes for the recorded media therebetween; and serrated surface means formed on the support surface of certain of the storage slots between the ribs for engaging a side of the storage boxes to retard sliding movement of the storage boxes from their slots.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
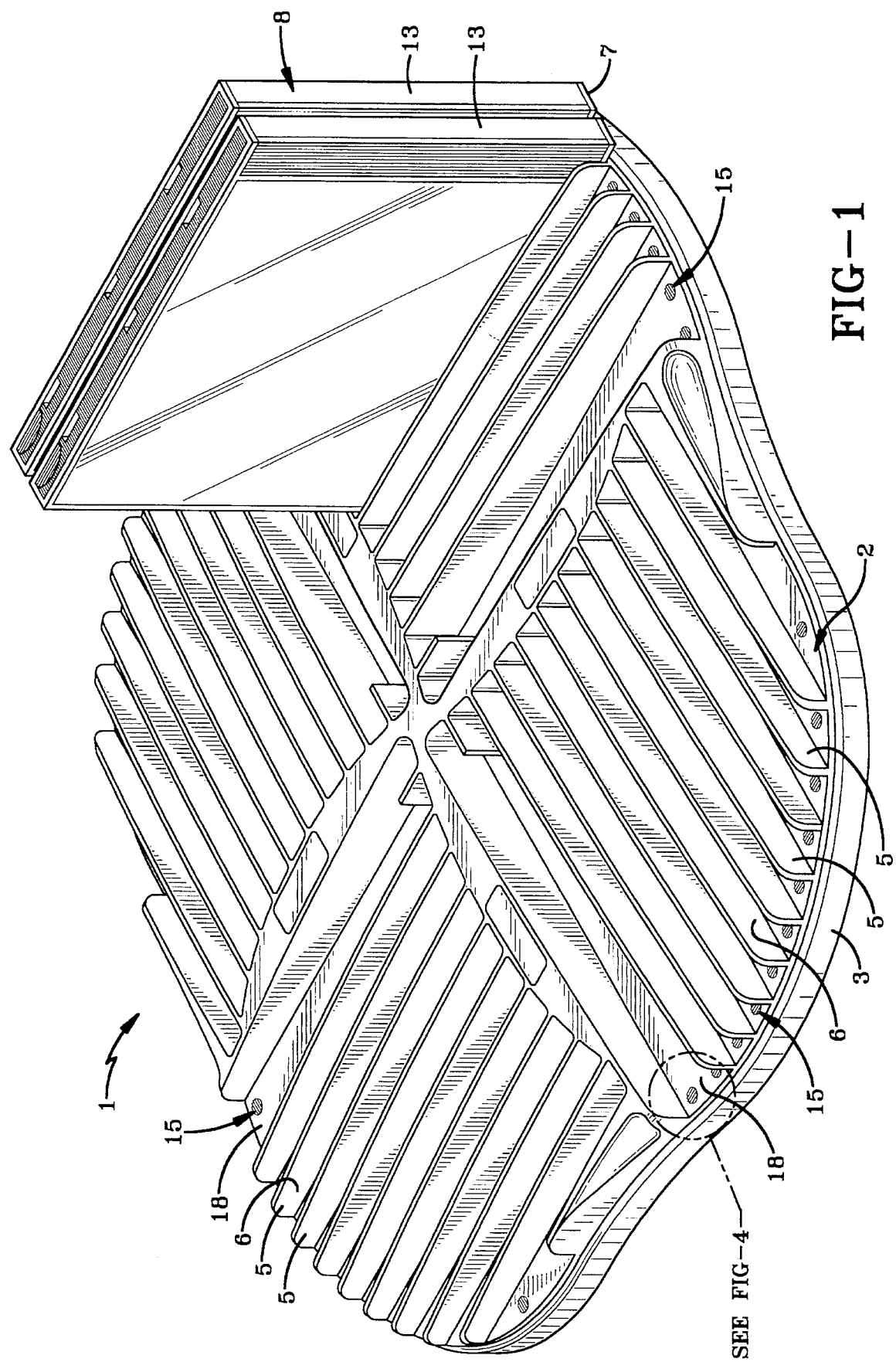
FIG. 1 is a perspective view showing one type of storage container for recorded media having the unique retaining device formed thereon, with two compact disc jewel storage boxes being shown mounted therein.
Figure 2:
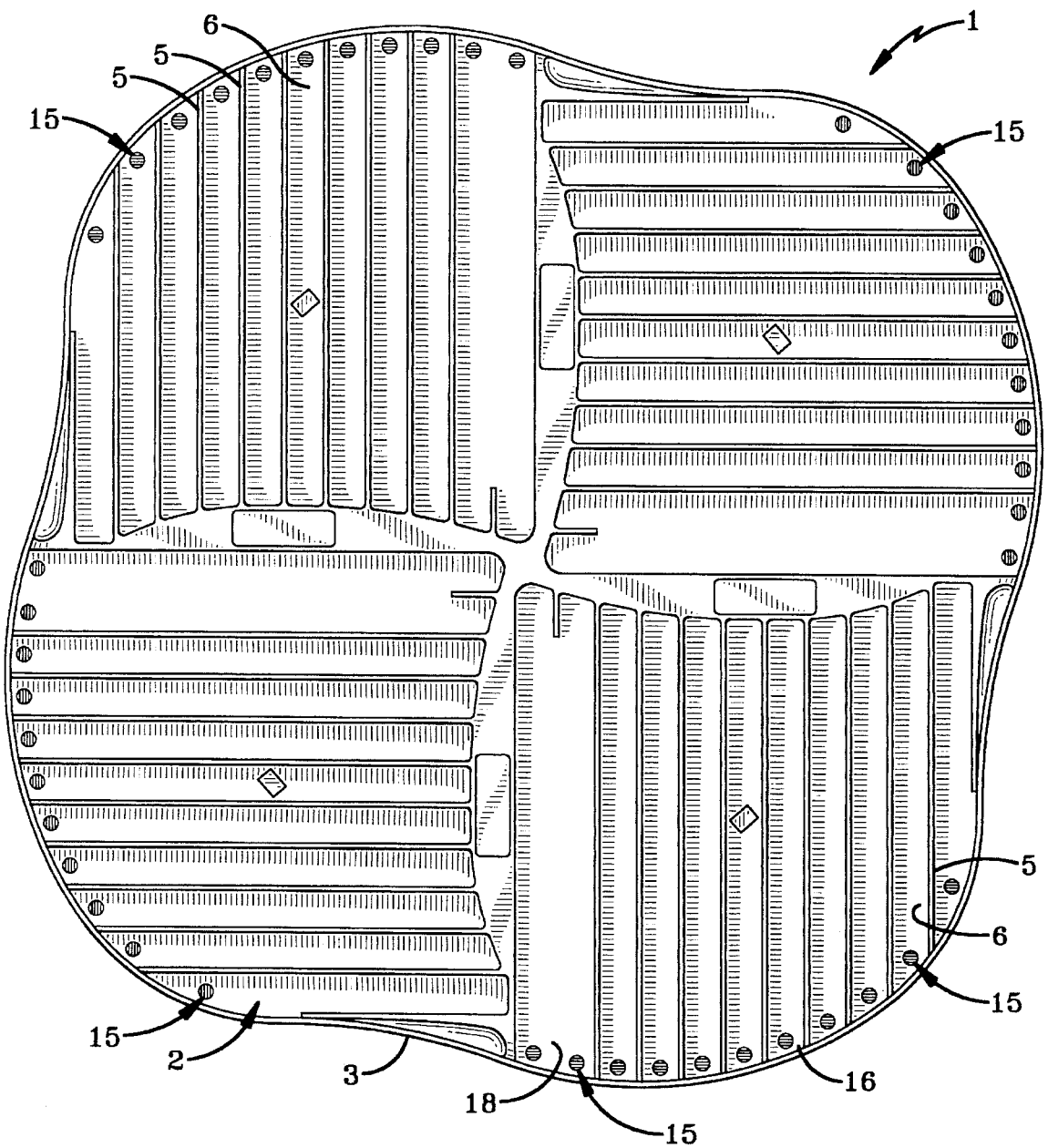
FIG. 2 is a top plan view of the storage container of FIG. 1 with the jewel boxes removed.
Figure 3:
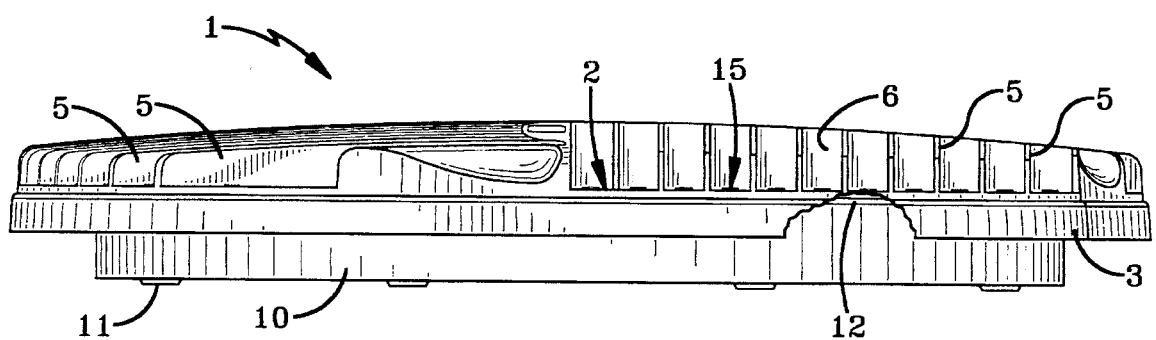
FIG. 3 is an end elevational view of FIG. 2.

The storage and display container of the present invention is indicated generally at 1, and is shown particularly in FIGS. 1–3. Storage container 1 has a generally circular configuration, as shown in FIG. 2, and includes a flat horizontal support surface, indicated generally at 2, which terminates in an outer downwardly extending peripheral flange 3. A plurality of spaced upwardly vertically extending ribs 5 are formed in various spaced arrangements on support surface 2, preferably integral therewith. An elongated storage slot 6 is formed between adjacent pairs of spaced ribs 5 and is adapted to slidably receive a side edge 7 of a storage box 8 of various recorded media therein. Two compact disc storage boxes 8, referred to as "jewel boxes" in the recording industry, are shown stored within a pair of slots 6 on support surface 2 in FIG. 1. It is readily understood that slots 6 could be considerably wider for receiving a video cassette storage box, floppy disc or CD ROM storage box, or the like, without affecting the concept of the invention. However, the preferred embodiment is intended for use for storing and displaying a plurality of compact discs in their storage jewel boxes.

Container 1 preferably is of the carrousel type and, as shown in FIG. 3, includes a circular base 10 which is adapted to be supported on a support surface by a plurality of pads or feet 11. Base 10 will be supported by a usual circular bearing ring 12 or similar device for rotatably mounting support surface 2 on base 10. This enables a viewer to be at one position, and, by rotating support surface 2 on base 10, view front edges 13 of the jewel boxes on which various printed indicia will be contained, identifying the recorded contents of the compact discs stored therein.

Likewise, it is readily understood that storage container 1 could consist of a plurality of support surfaces 2 stacked in a vertical relationship with respect to each other by vertically extending support posts having a height sufficient to provide a width between stacked support surfaces 2 for receiving a plurality of compact disc jewel boxes or video cassettes, etc.

In accordance with the invention, a serrated area, indicated generally at 15, is formed integrally with support surface 2, and preferably is located at a front end opening 16 of each storage slot 6 (FIG. 2). Certain of the storage slots, as indicated at 18, may have a width twice the width of storage slots 6 so as to receive a double CD jewel box therein. Preferably, for larger storage slots 18, a pair of spaced serrated areas 15 may be utilized, as shown in FIG. 2.

Figure 4:
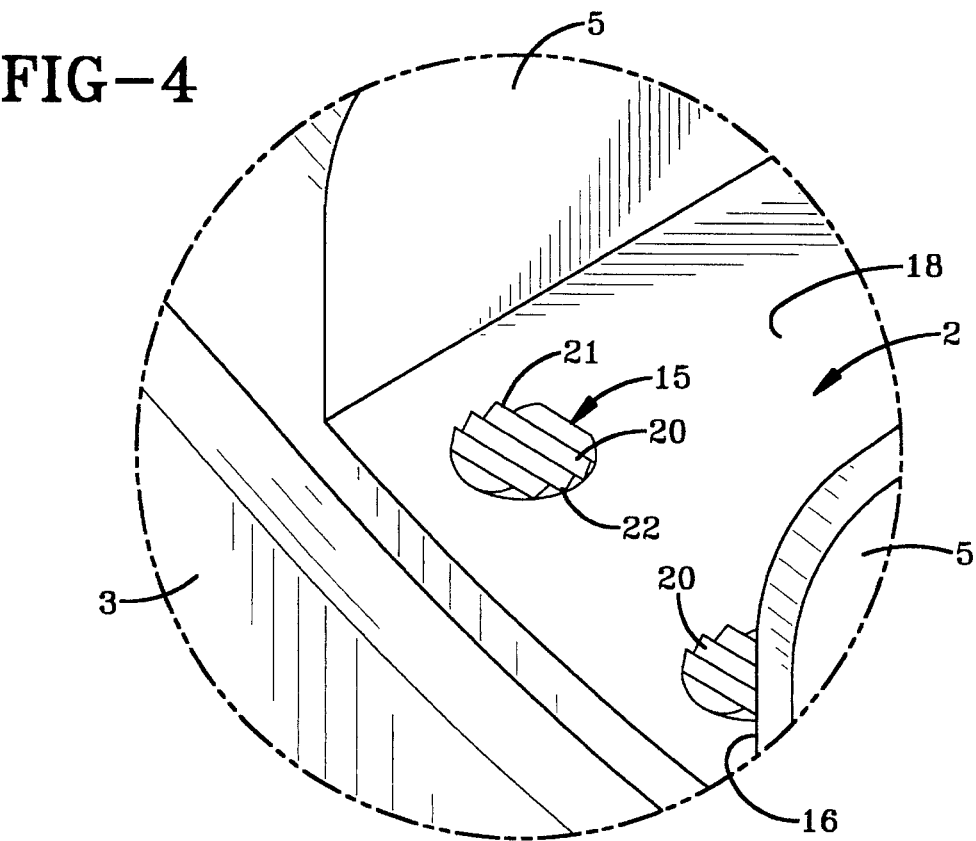
FIG. 4 is an enlarged fragmentary view of the encircle portion of FIG. 1.
Figure 5:
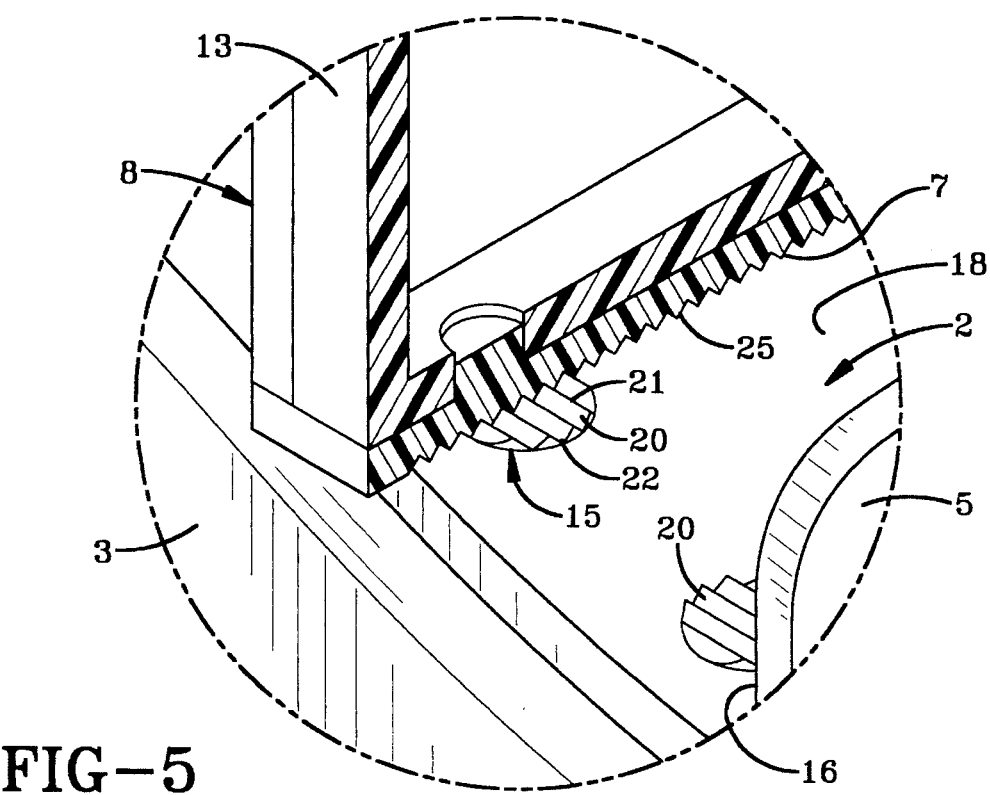
FIG. 5 is a perspective view similar to FIG. 4 showing a portion of a compact disc jewel box in section being retained in its storage slot by the retaining device of the invention.

Referring particularly to FIGS. 4 and 5, the serrated areas 15 include a plurality of serrated teeth 20 having sharp pointed crests 21 and intervening valleys 22. Although the serrated areas are shown as having a circular configuration in FIGS. 2, 4 and 5, which has been found convenient for molding purposes, it could have a rectangular or various other configurations without affecting the concept of the invention.

As shown in FIG. 5, bottom edge or side 7 of jewel storage box 8 is formed with a plurality of horizontally extending grooves or serrations 25 throughout the length of the container side. Serrations 25, which are formed on most jewel boxes in use today, will engage serrated area 15, and, due to the engagement therebetween, will retard the outward sliding movement of storage box 8 caused by the centrifugal force exerted thereon upon rotation of support surface 2. Even if the stored recorded media, and, in particular, the storage box in which it is contained, does not have serrations similar to serrations 25 along its support edge, serrated areas 15 still will assist in retarding the outward sliding movement of the storage box. However, the incorporation of the grooves or serrations 25 along the edges of the jewel box further increases the retardation of the outward sliding movement of the jewel boxes.

As shown in FIG. 5, serrated areas 15 can be molded integrally with support surface 2 without any extra components or parts being required, and without increasing the cost of production. Although the serrated areas are shown as circular, it is readily understood that a considerable number of other configurations and other types of projections or serrations can be formed integrally with support surface 2, either adjacent the front end opening 16 or spaced throughout the length of the storage slots, which will achieve the same function and purpose as that shown in the drawings and described above in the preferred embodiment.

Accordingly, the storage container of the present invention used for recorded media is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved storage container for recorded media is constructed and used, the characteristics of the construction, and the advantageous, new and useful results obtained; the new and useful structures, devices, elements, arrangements, parts and combinations, are set forth in the appended claims.

I claim:

1. A storage container for recorded media, including:

a support surface;

a plurality of spaced parallel elongated ribs formed on said support surface providing elongated storage slots between adjacent pairs of said ribs for slidably receiving storage boxes containing the recorded media therebetween, each of the storage slots having a front end opening providing access into said slots; and a serrated area formed on the support surface of certain of the storage slots between said ribs and within the storage slots and located adjacent the front end opening of said slots for engaging a side of the storage boxes to retard outward sliding movement of the storage boxes from the slots, said serrated area including a plurality of serrations comprising a series of teeth having raised ridges and intervening valleys formed integrally in the support surface.

2. The storage container defined in claim 1 in which the serrations are arranged in a circular configuration.

3. The storage container defined in claim 2 in which a singular circular configuration of the serrations is located adjacent the front end opening of each slot.

4. The storage container defined in claim 2 in which a pair of the circular configurations of serrations is located adjacent the front end opening of certain slots.

5. The storage container defined in claim 1 in which the storage container further includes means for rotatably mounting the support surface.

6. The storage container defined in claim 5 in which the support surface is substantially horizontal and the ribs are formed integrally with the surface and extend vertically upwardly from the surface.

7. In combination, a storage container and a storage box for recorded media located within the container, including:

a support surface provided on the storage container;

a plurality of spaced parallel elongated ribs formed on the supporting surface and forming storage slots between adjacent pairs of said ribs;

projections formed along a side of the storage box, said storage box being a jewel box for storing a compact disc and said projections being a series of serrations formed along the side of the storage box; and projection means formed on the support surface of certain of the storage slots between the ribs for engaging the projections of the storage box to retard sliding movement of said storage box from said slot of the storage container.

8. The combination defined in claim 7 in which each of the storage slots is formed with a front end opening; and in which the projection means comprises a section of serrated teeth located adjacent the front end opening of certain of said slots.

9. The combination defined in claim 8 in which a pair of spaced sections of serrated teeth is located adjacent the front end opening of certain of said slots.

10. The combination defined in claim 8 in which said section of serrated teeth has a circular configuration.

11. The storage container defined in claim 7 in which the storage container further includes means for rotatably mounting the supporting surface.

12. The storage container defined in claim 7 in which the support surface is substantially horizontal and the ribs are formed integrally with said surface and extend vertically upward therefrom.

13. In combination, a storage container and storage box for recorded media located within the container, including:

a support surface provided on the storage container;

a plurality of spaced parallel elongated ribs formed on the supporting surface and forming storage slots between adjacent pairs of said ribs, each of said storage slots being formed with a front end opening;

projections formed along a side of the storage box, said storage box being a jewel box for storing a compact disc and said projections being a series of serrations formed along the side of the storage box; and projection means formed on the support surface of certain of the storage slots between the ribs for engaging the projections of the storage box to retard sliding movement of said storage box from said slot of the storage container.

\* \* \* \* \*